US009853335B2

(12) United States Patent
Blackwelder et al.

(10) Patent No.: US 9,853,335 B2
(45) Date of Patent: Dec. 26, 2017

(54) THERMAL MANAGEMENT OF ENERGY STORAGE

(71) Applicant: Rolls-Royce North American Technologies, Inc., Indianapolis, IN (US)

(72) Inventors: Mark J. Blackwelder, Plainfield, IN (US); Rigoberto J. Rodriguez, Avon, IN (US); Steve T. Gagne, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 375 days.

(21) Appl. No.: 14/573,598

(22) Filed: Dec. 17, 2014

(65) Prior Publication Data
US 2015/0180100 A1    Jun. 25, 2015

Related U.S. Application Data

(60) Provisional application No. 61/920,404, filed on Dec. 23, 2013.

(51) Int. Cl.
*F25D 11/00* (2006.01)
*H01M 10/613* (2014.01)
(Continued)

(52) U.S. Cl.
CPC .......... *H01M 10/613* (2015.04); *F25D 17/02* (2013.01); *H01M 10/625* (2015.04); *H01M 10/6557* (2015.04); *H01M 10/6568* (2015.04); *H01M 10/6569* (2015.04); *H01M 10/663* (2015.04); *H01M 10/615* (2015.04); *H01M 2220/20* (2013.01)

(58) Field of Classification Search
CPC ............. H01M 10/613; H01M 10/625; H01M 10/6568; H01M 10/6569; H01M 10/6145; H01M 10/615; H01M 2220/20; B60H 1/00278
See application file for complete search history.

(56) References Cited

U.S. PATENT DOCUMENTS 5,015,545 A    5/1991   Brooks
5,577,747 A   11/1996   Ogawa et al.
(Continued)

FOREIGN PATENT DOCUMENTS

DE    102009006426 A1    7/2010
EP         1699100 A1    9/2006
(Continued)

OTHER PUBLICATIONS

European Search Report for EP14199948 dated Apr. 28, 2015.

*Primary Examiner* — Elizabeth Martin
(74) *Attorney, Agent, or Firm* — Fishman Stewart PLLC

(57) ABSTRACT

An energy storage thermal management system includes an energy storage compartment including a liquid coolant bath portion and a vapor portion. A plurality of energy storage cells are positioned within the energy storage compartment and submerged within the liquid coolant bath. A compressor is in communication with the vapor portion to remove vapor. A condenser is in communication with the compressor and returns liquid coolant to the energy storage compartment.

10 Claims, 4 Drawing Sheets

(51) Int. Cl.
  *H01M 10/625* (2014.01)
  *H01M 10/663* (2014.01)
  *H01M 10/6568* (2014.01)
  *H01M 10/6569* (2014.01)
  *H01M 10/6557* (2014.01)
  *F25D 17/02* (2006.01)
  *H01M 10/615* (2014.01)

(56) References Cited

U.S. PATENT DOCUMENTS

| | | | |
|---|---|---|---|
| 5,937,664 | A | 8/1999 | Matsuno et al. |
| 6,106,972 | A | 8/2000 | Kokubo et al. |
| 6,138,466 | A | 10/2000 | Lake et al. |
| 6,422,027 | B1 | 7/2002 | Coates, Jr. et al. |
| 6,479,185 | B1 | 11/2002 | Hilderbrand et al. |
| 6,481,230 | B2 | 11/2002 | Kimishima et al. |
| 7,403,392 | B2 | 7/2008 | Attlesey et al. |
| 7,764,494 | B2 | 7/2010 | Balzano |
| 7,890,218 | B2 | 2/2011 | Adams et al. |
| 7,911,793 | B2 | 3/2011 | Attlesey |
| 2011/0048066 | A1 | 3/2011 | Gielda et al. |
| 2012/0003515 | A1* | 1/2012 | Eisenhour ........... H01M 10/625 429/62 |
| 2013/0199217 | A1* | 8/2013 | Arai .................... B60H 1/00278 62/79 |
| 2013/0298588 | A1* | 11/2013 | Jojima ..................... H02J 7/00 62/259.2 |

FOREIGN PATENT DOCUMENTS

| | | |
|---|---|---|
| JP | H09259940 A | 10/1997 |
| JP | H1140211 A | 2/1999 |
| WO | WO-2008/062298 A1 | 5/2008 |
| WO | WO-2012/003209 A1 | 1/2012 |

\* cited by examiner

THERMAL MANAGEMENT OF ENERGY STORAGE

CROSS-REFERENCE TO RELATED APPLICATIONS

This application claims priority to U.S. Provisional Patent Application No. 61/920,404, filed Dec. 23, 2013, the contents of which are hereby incorporated in their entirety.

FIELD OF TECHNOLOGY

An improved integrated design and control of a gas turbine is disclosed. More particularly, performance and efficiency are improved by optimizing the thermal management of storage of energy generated by the gas turbine. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

Electrical storage typically requires active cooling in order to maintain operable temperatures of the storage/battery cells. Common approaches to providing such cooling utilize multiple cooling loops in order to safely transfer heat away from the storage cells. These systems can be bulky and heavy which runs contrary to the needs of fuel efficiency and performance. Overheating of many battery cells can result in failure of the electrical storage system.

Overcoming these concerns would be desirable and could improve electrical storage, reduce weight, and increase the reliability of electrical storage.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
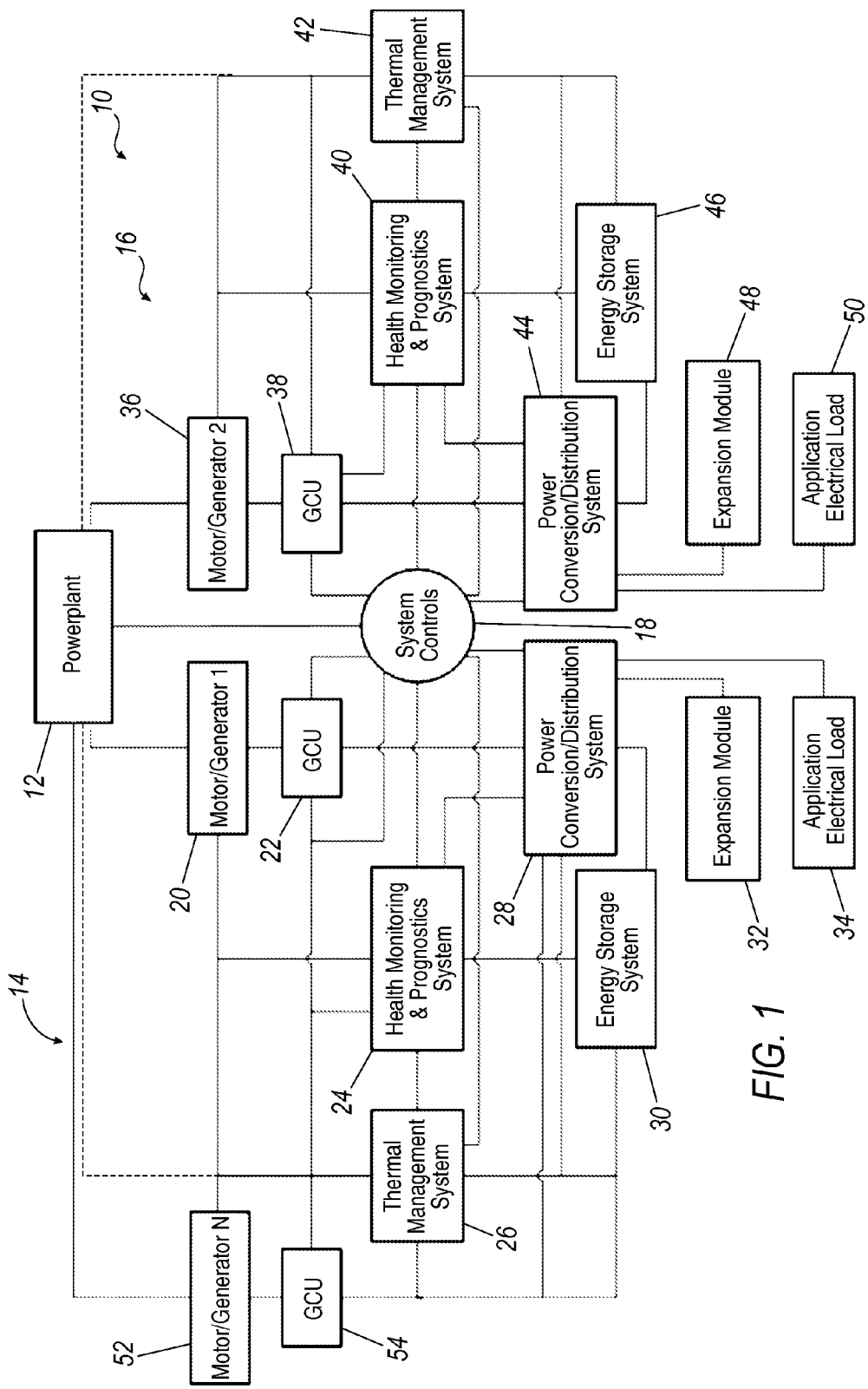
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
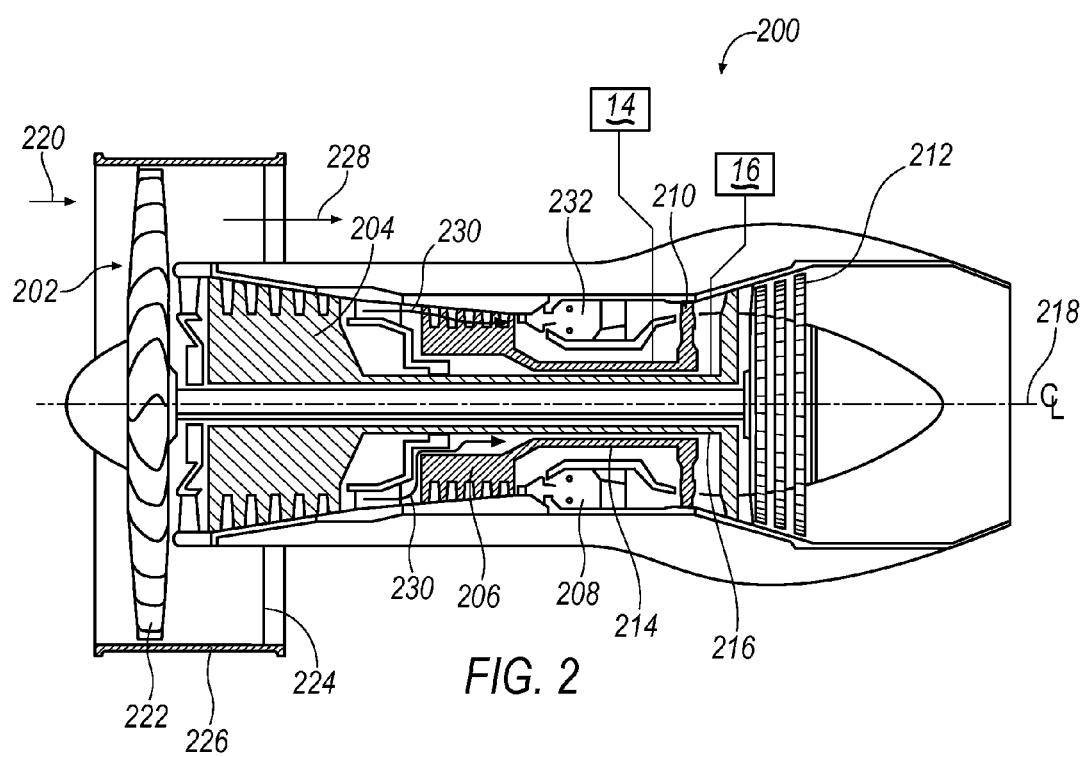
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation. Similarly the first and second power circuits 14, 16 both include their own thermal management systems 26, 42 and energy storage systems 30, 46 to provide an increase in on demand electrical energy as well as redundancy.

Figure 3:
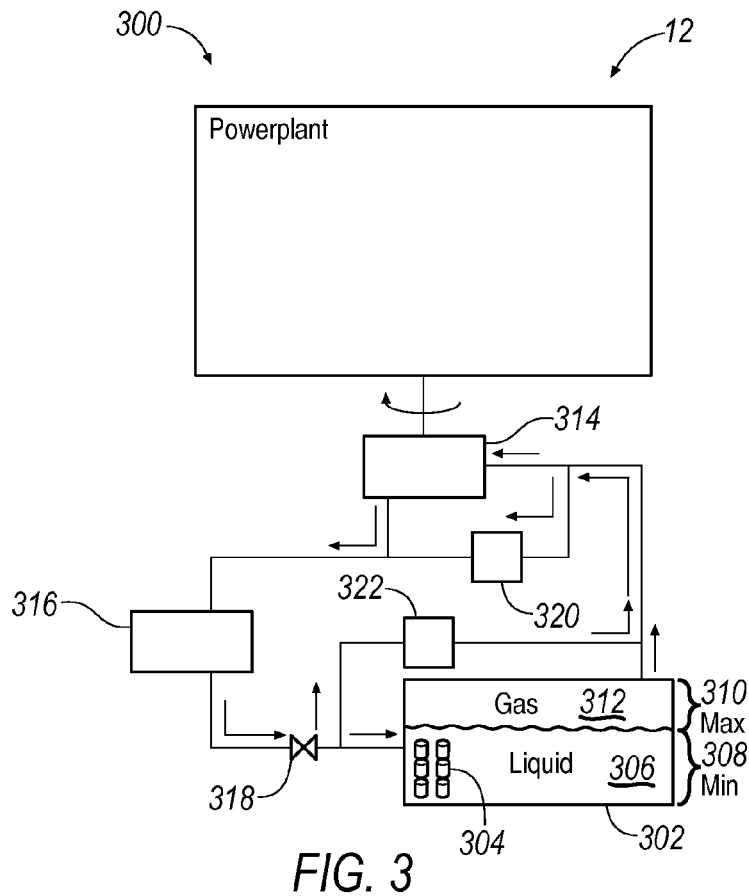
FIG. 3 illustrates a thermal management system detail for the system illustrated in FIG. 1.

FIG. 3 illustrates an embodiment of an energy storage thermal management system 300 in accordance with this disclosure. The energy storage thermal management system 300 includes an energy storage compartment 302 housing a plurality of energy storage cells 304. It is contemplated that the energy storage cells 304 can comprise any of a wide variety of mediums for containing and storing electrical energy. In at least one non-limiting embodiment this is intended to include chemical and electrochemical based energy storage systems. In another non-limiting embodiment it is contemplated that the energy storage cells 304 may comprise metal oxide ceramic and/or carbon based storage cells. These energy storage cells 304 may generate significant thermal energy during storage and usage that requires dissipation.

The energy storage thermal management system 300 contemplates the energy storage compartment 302 is at least partially filled with a liquid coolant bath 306 to form a liquid coolant bath portion 308 and a vapor portion 310 positioned above the liquid coolant bath 306. The plurality of energy storage cells 304 is preferably submerged within the liquid coolant bath 306. It is contemplated that the liquid coolant bath 306 may comprised a variety of coolant compositions which would be understood to one skilled in the art in light of this disclosure. In at least one embodiment the liquid coolant bath 306 comprises a composition that cools the plurality of energy storage cells 304 through a process known as nucleate boiling. The nucleate boiling removes thermal energy from the energy storage cells 304 and generates vapor 312 that fills the vapor portion 310 of the energy storage compartment 302. The energy storage compartment 302, therefore, operates as an evaporator.

A pump or compressor 314 removes vapor from the vapor portion 310, compresses it, and moves it into a condenser 316 or heat exchanger. This transforms the compressed vapor back into a coolant liquid. In at least one embodiment, the compressor 314 may be driven by the powerplant 12 through the use of a gearbox. An expansion valve 318 may also be positioned in between the condenser 316 and the energy storage compartment 302. The now cooled liquid coolant bath 306 is then returned to the energy storage compartment 302. Although the return of the liquid coolant bath 306 to the energy storage compartment 302 may be accomplished in a variety of fashions, one embodiment contemplates returning the liquid coolant bath 306 as a mixed phase liquid/gas mixture that may be sprayed onto the energy storage cells.

It is contemplated that the energy storage thermal management system 300 may further include a first bypass valve 320 allowing the flow of liquid coolant bath 306 to bypass the compressor 314. This may be utilized to allow single phase cooling (liquid) of the liquid coolant bath 306 during periods of low thermal demand. A second bypass valve 322 may be utilized to bypass the energy storage compartment 302 altogether when the energy storage compartment is in a steady state. Additionally, it is contemplated that the system 300 may be run in reverse to impart heat into the energy storage compartment 302 during periods of low environmental temperatures. The bypass valves 320, 322 may be selectively utilized to implement the reverse flow.

The described energy storage thermal management system 300 removes the necessity for secondary cooling loops and therefore reduces weight and reduces the number of components. Furthermore, by submerging the plurality of energy storage cells 304 in the liquid coolant bath 306, the system 300 displaces oxygen from direct contact with the energy storage cells 304. This provides corrosion protection as well as automatically quenching any combustion that should occur from cell failure. Also, the liquid coolant bath 306 may be utilized as a reservoir for additional thermal management needs outside of the energy storage compartment 302.

Figure 4:
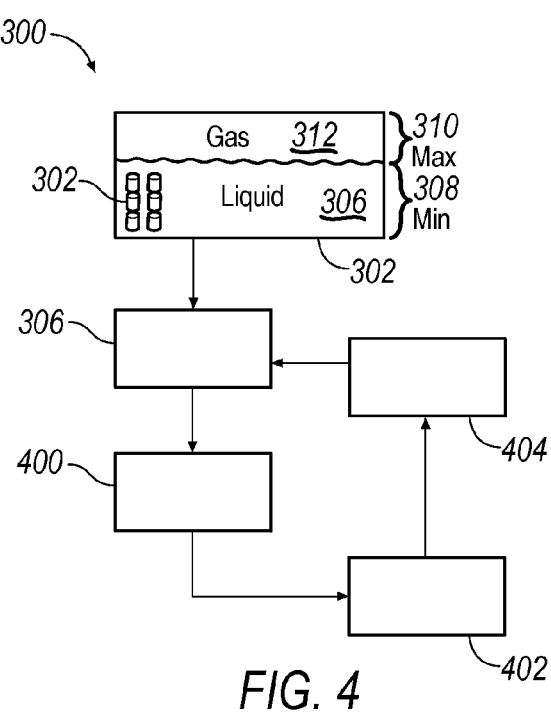
FIG. 4 illustrates a second embodiment of the thermal management system illustrated in FIG. 3.

FIG. 4 illustrates an embodiment of the energy storage thermal management system 300 wherein the liquid coolant bath 306 may be utilized as a reservoir. The liquid coolant bath 306 is transferred from the energy storage compartment 302 and moved into at least one additional heat-sink/evaporator 400. It is contemplated that this additional heat-sink/evaporator 400 may be additional electrical storage or may be any other thermal management need such as in-cabin air conditioning. The liquid coolant bath 306 may be transferred into any number of additional heat-sink/evaporators 402, 404 before being returned to the energy storage compartment 302. It is contemplated that upon return to the energy storage compartment 302 the coolant may be in a mixed vapor/liquid phase. The liquid coolant bath portion 308 will separate the return into a liquid coolant bath portion 308 and a vapor portion 310. In this fashion, any number of thermally controlled applications 302, 400, 402, 404 may be managed by a single compressor 314 and condenser 316. This provides a reduction in operating parts as well as a reduction in weight.

Figure 5A:
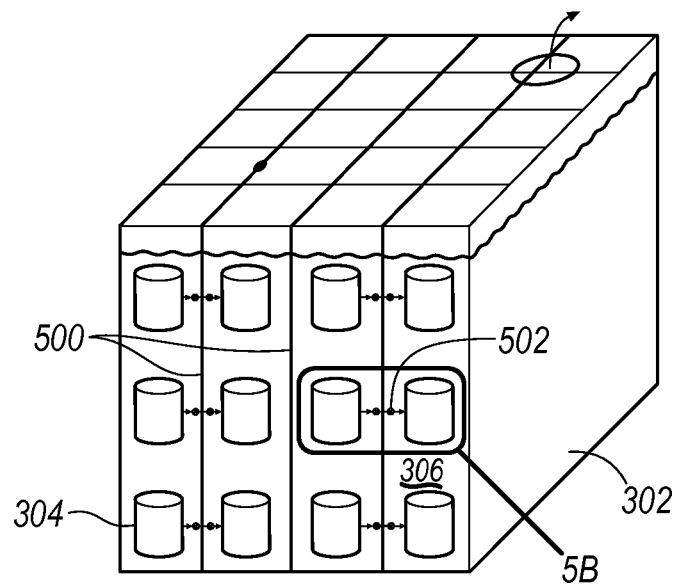
FIG. 5 illustrates an energy storage compartment for use in the thermal management systems illustrated in FIGS. 3 and 4.
Figure 5B:
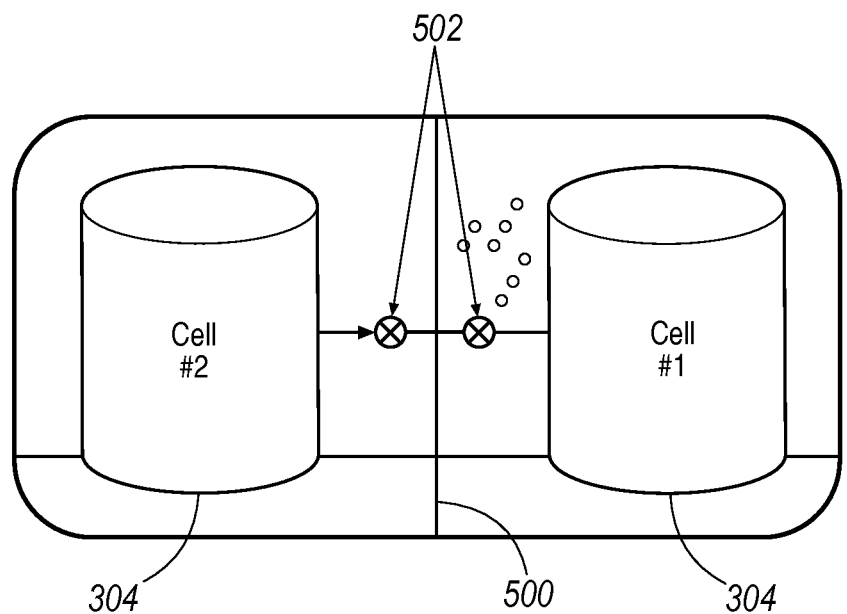

FIG. 5 illustrates an embodiment of the energy storage compartment 302 for use in the disclosures illustrated in FIGS. 3 and 4 above. The energy storage compartment 302 may include a plurality of distribution manifolds 500 positioned between adjoining pairs of the energy storage cells 306. It is contemplated that the distribution manifolds may separate individual cells or groups of cells. The distribution manifolds 500 preferably include expansion valves 502 positioned within that allow selective flow of the liquid coolant bath 306 to pass through the distribution manifold 500. When an individual cell experiences nucleate boiling, the vapor moving towards the vapor portion 310 will draw liquid coolant from the neighboring cell through the expansion valve 502. This provides a unique method to address and remove localized hot spots in the energy storage compartment 302 by diverting coolant directly towards localized heating. It is contemplated that the expansion valves 502 may operate passively as described or may comprise actively controlled valves. In an active controlled embodiment an active sensor and control system would be utilized to control flow through the expansion valves 502. It should be understood that a wide variation of manifold 500 and valve 502 arrangements and controls would be known to one skilled in the art in light of the present disclosure.

Computing devices such as system 10 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An energy storage thermal management system comprising:
    an energy storage compartment including a liquid coolant bath portion and a vapor portion;
    a plurality of energy storage cells positioned within said energy storage compartment and submerged within said liquid coolant bath;
    a compressor in communication with said vapor portion, said compressor removing vapor from said vapor portion; and
    a condenser in communication with said compressor, said condenser returning liquid coolant to said energy storage compartment;
    at least one distribution manifold positioned between an adjoining pair of said plurality of energy storage cells;
        at least one expansion valve positioned on said distribution manifold between said adjoining pair of energy storage cells, said at least one expansion valve allowing said liquid coolant bath to flow through said at least one distribution manifold towards regions of localized heat.

2. The energy storage thermal management system as claimed in claim 1, wherein said liquid coolant bath cools said plurality of energy storage cells through nucleate boiling.

3. The energy storage thermal management system as claimed in claim 1, wherein said liquid coolant is returned as a mixed phase liquid/gas mixture sprayed onto said plurality of energy storage cells.

4. The energy storage thermal management system as claimed in claim 1, further comprising:
 a first bypass valve allowing said liquid coolant bath to bypass said compressor and flow into said condenser for single phase cooling operation.

5. The energy storage thermal management system as claimed in claim 1, wherein said at least one expansion valve is actively controlled.

6. The energy storage thermal management system as claimed in claim 1, wherein said at least one expansion valve is passively controlled.

7. The energy storage thermal management system as claimed in claim 1, further comprising:
 an expansion valve positioned between said condenser and said energy storage compartment.

8. A method of cooling an energy storage system comprising:
 submerging a plurality of energy storage cells within a liquid coolant bath contained within an energy storage compartment;
 removing vapor from above said liquid coolant bath using a compressor;
 sending compressed vapor from said compressor to a condenser; and
 returning liquid coolant from said condenser to said energy storage compartment;
 separating at least one adjoining pair of said plurality of energy storage cells using a distribution manifold;
 controlling flow of said liquid coolant bath through said distribution manifold using an expansion valve, said expansion valve allowing said liquid coolant bath to flow through said distribution manifold towards regions of localized heat.

9. The method of cooling an energy storage system as claimed in claim 8, further comprising:
 cooling said plurality of energy storage cells through nucleate boiling.

10. The method of cooling an energy storage system as described in claim 8, further comprising:
 returning said liquid coolant to said energy storage compartment as a mixed phase liquid/gas mixture sprayed onto said plurality of energy storage cells.

* * * * *